(12) United States Patent
Simmonds (10) Patent No.: US 8,107,780 B2
(45) Date of Patent: Jan. 31, 2012

(54) DISPLAY PROJECTORS

(75) Inventor: Michael David Simmonds, Rochester (GB)

(73) Assignee: BAE Systems PLC, London (GB)

( * ) Notice: Subject to any disclaimer, the term of this patent is extended or adjusted under 35 U.S.C. 154(b) by 0 days.

(21) Appl. No.: 12/301,859

(22) PCT Filed: Nov. 11, 2008

(86) PCT No.: PCT/GB2008/051049
§ 371 (c)(1),
(2), (4) Date: Jul. 21, 2009

(87) PCT Pub. No.: WO2009/077772
PCT Pub. Date: Jun. 25, 2009

(65) Prior Publication Data
US 2010/0246004 A1   Sep. 30, 2010

(30) Foreign Application Priority Data

Dec. 18, 2007  (EP) ..................................... 07270075
Dec. 18, 2007  (GB) ................................... 0724602.8

(51) Int. Cl.
*G02B 6/34* (2006.01)
*G02B 27/01* (2006.01)
*G02B 27/44* (2006.01)
*G02F 1/1335* (2006.01)

(52) U.S. Cl. ............ 385/37; 385/31; 385/129; 385/901; 349/5; 349/11; 359/567

(58) Field of Classification Search .................. 385/37, 385/31, 15, 39, 50, 129, 130, 131, 132, 901; 349/5, 6, 7, 11, 13, 14, 15, 201, 202; 359/567
See application file for complete search history.

(56) References Cited

U.S. PATENT DOCUMENTS

| 4,711,512 | A   | 12/1987 | Upatnieks ................. 359/567 X |
| 6,400,876 | B1* | 6/2002  | Biscardi et al. ............... 385/120 |
| 6,608,961 | B2* | 8/2003  | Travis .......................... 385/146 |
| 7,418,170 | B2* | 8/2008  | Mukawa et al. ................ 385/31 |
| 7,907,342 | B2* | 3/2011  | Simmonds et al. ........... 359/630 |

(Continued)

FOREIGN PATENT DOCUMENTS

EP   1 385 023 B1   11/2004

(Continued)

OTHER PUBLICATIONS

International Preliminary Report on Patentability in related application PCT/GB2008/051049 mailed Apr. 1, 2010.
International Search Report and Written Opinion for PCT International Application No. PCT/GB2008/051049, mailed Mar. 23, 2009 (10 pages).
British Search Report issued in GB0724602.8, Apr. 1, 2008, 6 pages.
European Search Report issued in 07270075.0, May 29, 2008, 7 pages.

(Continued)

*Primary Examiner* — Brian Healy
(74) *Attorney, Agent, or Firm* — Pillsbury Winthrop Shaw Pittman LLP (57) ABSTRACT

The present invention is directed to a display which presents an image along a line of sight of an observer, such that the image is overlaid on a real world scene has a first waveguide and an image source device to inject the image into the first waveguide. The first waveguide has a first grating to direct the image internally and to output the image from the first waveguide. A second waveguide has a coupling grating to receive the image from the first waveguide and to direct the image along the second waveguide. The second waveguide has an exit grating to diffract the received image out of the second waveguide towards the observer. The exit grating diffracts the image out of the second waveguide off axis to a normal axis of the second waveguide.

19 Claims, 6 Drawing Sheets

U.S. PATENT DOCUMENTS

| | | | | |
|---|---|---|---|---|
| 8,023,783 B2 * | 9/2011 | Mukawa et al. | | 385/31 |
| 2002/0008854 A1 * | 1/2002 | Leigh Travis | | 353/69 |
| 2002/0171939 A1 | 11/2002 | Song | | 359/630 |
| 2006/0228073 A1 * | 10/2006 | Mukawa et al. | | 385/31 |
| 2009/0190222 A1 * | 7/2009 | Simmonds et al. | | 359/567 |
| 2010/0246004 A1 * | 9/2010 | Simmonds | | 359/567 |

FOREIGN PATENT DOCUMENTS

| | | |
|---|---|---|
| WO | 88/05176 A1 | 7/1988 |
| WO | 2004/109349 A2 | 12/2004 |
| WO | 2007/029032 A1 | 3/2007 |
| WO | 2007/052265 A2 | 5/2007 |

\* cited by examiner

DISPLAY PROJECTORS

CROSS REFERENCE TO RELATED APPLICATIONS

This is the U.S. National Phase of PCT/GB2008/051049, filed Nov. 11, 2008, which claims priority to British Application No. 0724602.8, filed Dec. 18, 2007, and European Application No. 07270075.0, filed Dec. 18, 2007, the entire contents of all of which are incorporated herein by reference.

This invention relates to a projection display for displaying an image to an observer, which is particularly, but not exclusively, suitable for use in a head up display, a helmet mounted display or head mounted display.

Figure 1:
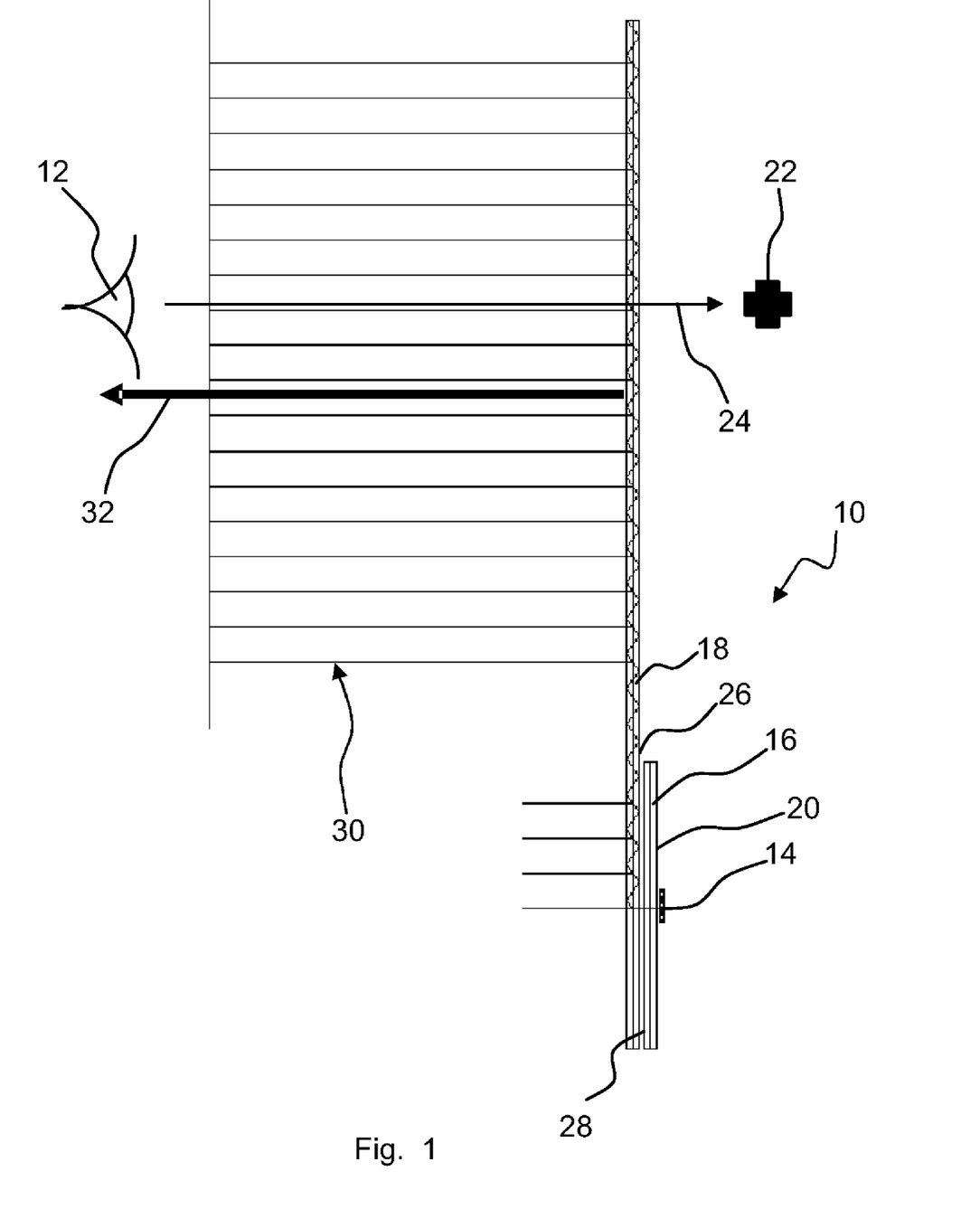
FIG. 1 illustrates, in elevation, a prior art projection display including co-planar waveguides.

Referring to FIG. 1, that shows in elevation view, prior art International patent application publication number WO2007/029032, which teaches a projection display 10 for displaying an image to an observer 12 that uses waveguide techniques to generate a collimated display defining a large exit pupil at the point of the observer 12 and a large field of view, whilst using a small image-providing light source device 14. The projection display uses a first plate-like waveguide 16 made of light transmissive material such as glass or plastic and a second plate-like waveguide 18 made from a light transmissive and light transparent material such as glass or plastic. The image providing light source device 14 is located to inject image bearing light into the first plate-like waveguide 16 through a first face 20.

The image-providing light source device 14 includes a micro-display arranged to provide information to be displayed to the observer 12. Additionally the image-providing light source device 14 includes a collimating optical arrangement located between the micro-display and the first face 20 of the first plate-like waveguide 16. The collimating optical arrangement is operable to collimate light received from the micro-display and to inject the collimated image bearing light into the first plate-like waveguide 16 through the first face 20.

The collimated image bearing light produced by the collimating optical arrangement has a small exit pupil and is fed into the first plate-like waveguide 16, which performs the function of stretching the horizontal pupil of the final display to be displayed to the observer 12. The output from the first plate-like waveguide 16 is fed into the second plate-like waveguide 18, which is arranged to stretch the vertical pupil of the final display and also to act as a combiner for the projection display 10 through which the observer 12 views an outside world scene 22 along a line of sight 24 with information to be displayed to the observer 12 overlaid on the outside world scene 22. In this manner, the information to be displayed to the observer 12 looking through the plate-like waveguide 18 defines a large exit pupil and a large field of view whilst using a small image generating light source 14.

Image bearing light injected into first plate-like waveguide 16, via first face 20 is incident on a transmission grating arranged internally within the first plate-like waveguide 16 and substantially co-planar with the first face 20. Light impinging on the transmission grating diffracts therefrom such that the incidence angle of the light on the internal surfaces of the first plate-like waveguide 16 is greater than the critical angle for the material from which the first plate-like waveguide 16 is made. The image bearing light is constrained within the first plate-like waveguide 16 to propagate along the first plate-like waveguide 16 reflecting from each internal surface in turn to follow a predefined light path. Thus, the relative field angles of the light incident on the first plate-like waveguide 16 at the first face 20 are preserved within the first plate-like waveguide 16 and the information required to regenerate the original image is preserved.

The transmission grating also serves to output the image bearing light from the first plate-like waveguide 16. The transmission grating is a low efficiency grating which diffracts a small amount of light out of the first plate-like waveguide 16 on each interaction with incident image bearing light.

The second plate-like waveguide 18 is located with a first face 26 co-planar with a second face 28 of the first plate-like waveguide 16 and is arranged to receive the image bearing light exiting the second face 28 of the first plate-like waveguide 16. The second face 28 is co-planar to the first face 20 of the first plate-like waveguide 16. The first face 26 of the second plate-like waveguide 18 is located adjacent and close to the second face 28 of the first plate-like waveguide 16. The second plate-like waveguide 18 includes a coupling grating located therein arranged substantially co-planar to the first face 26 of the second plate-like waveguide 18 and the coupling grating is operable to diffract each impinging ray of image bearing light received from the transmission grating of the first plate-like waveguide 16 at an angle that is larger than the critical angle for the material from which the second plate-like waveguide 18 is made. Accordingly, received image bearing light will propagate inside the second plate-like waveguide 18 to follow a predefined light path. The image bearing light continues along the light path to an exit grating arranged on or within the second plate-like waveguide 18, which is arranged to diffract the received image bearing light out of the second plate-like waveguide 18 towards the observer 12.

The coupling grating is arranged such that its diffractive power is rotated through 90 degrees to that of the diffractive power of the co-planar transmission grating to rotate incident image bearing light towards the exit grating.

The exit grating is a low efficiency grating, such that as image bearing light propagates along the light path within the second plate-like waveguide 18, each interaction with the exit grating causes a small proportion of image bearing light to be diffracted out of the second plate-like waveguide 18. Image bearing light which is not diffracted out of the second plate-like waveguide 18 continues to propagate within the second plate-like waveguide 18. Accordingly, a large number of parallel rays 30 of image bearing light exit the second plate-like waveguide 18 through the exit grating towards the observer 12, which originated at discrete points on the micro-display forming the image generating light source device 14. Accordingly, the observer 12 will view a real world scene 22 with the image to be displayed to the observer 12 overlaid on the real world scene 22.

Figure 2:
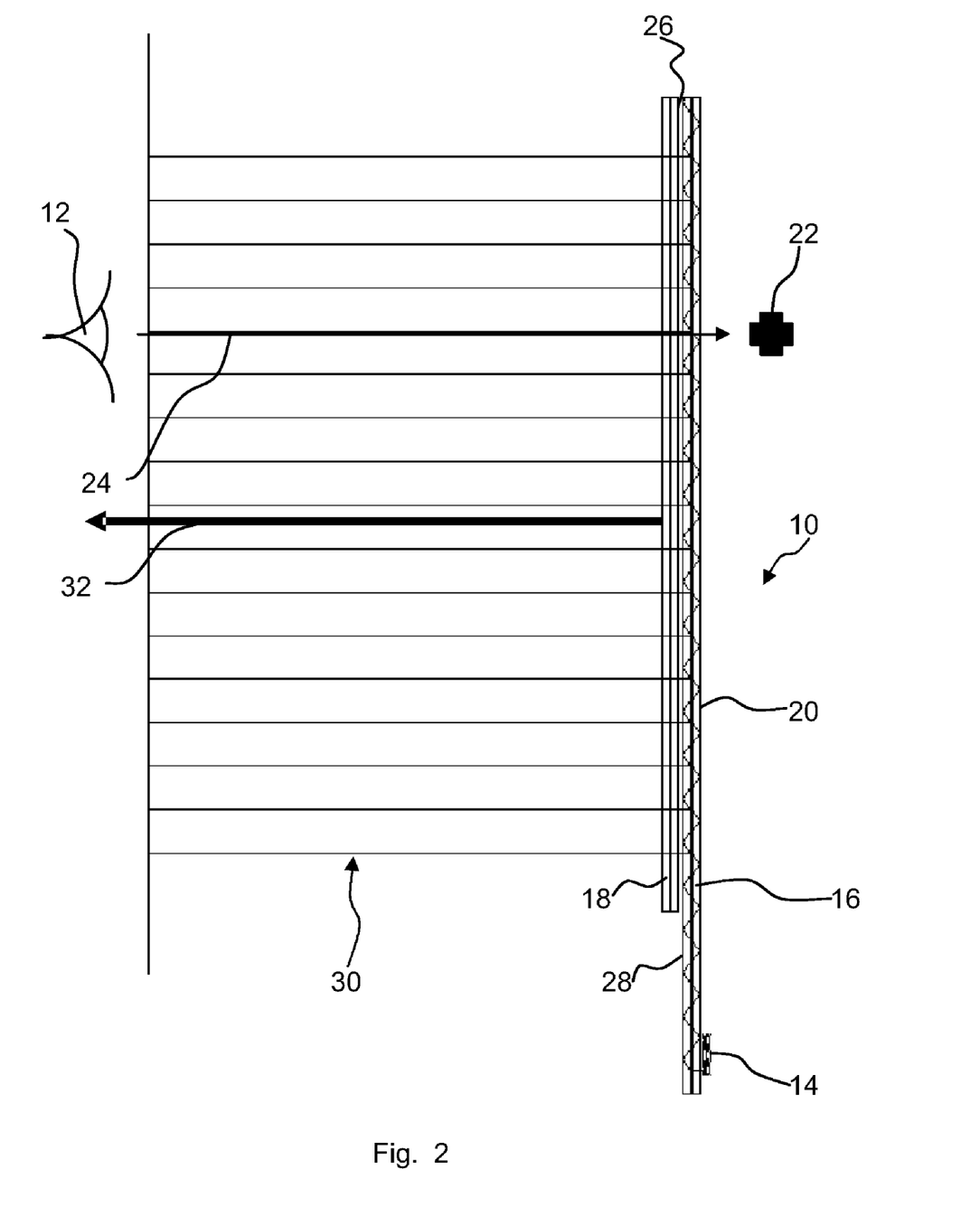
FIG. 2 illustrates, in plan view, the prior art projection display of FIG. 1.

Referring to FIG. 2, where in like references have been used to indicate similar integers to those described with reference to FIG. 1, there is shown the prior art projection display 10 in plan view.

It will be immediately apparent that the parallel rays 30 of the prior art projection display 10, illustrated in FIGS. 1 and 2, exit the second plate-like waveguide 18 along an axis 32 normal to the second plate-like waveguide 18.

According to a first aspect of the present invention a projection display, for displaying an image to an observer, includes: a first waveguide element arranged to be light transmissive; an image-providing light source device arranged to generate an image and to inject image bearing light into the first waveguide element; a first grating associated with the first waveguide element arranged to direct the image bearing light internally along the first waveguide element and through which the image bearing light is outputted from the first waveguide element; a second waveguide element arranged to be light transmissive and transparent that includes a coupling grating arranged to receive the image bearing light from the first waveguide element and to direct the image bearing light along the second waveguide element; the second waveguide element further includes an exit grating arranged to diffract received image bearing light out of the second waveguide element towards an observer; and wherein the exit grating is arranged to diffract image bearing light out of the second waveguide element off axis to a normal axis of the second waveguide element.

In this manner, the image to be displayed can be provided offset to an axis normal to the second waveguide element, thereby allowing the orientation of the projection display, relative to the housing to which is attached, to be altered thus providing greater scope to install such a projection display within the housing. For example, the projection display could be mounted within a cockpit of an aircraft, wherein the size constraints of the cockpit would result in difficulty in installing a prior art projection display, as the prior art projection display would need to be mounted such that the normal axis of the second plate-like waveguide is aligned to a line of sight of an observer using the projection display. However, in the present invention, the projection display can be mounted such the normal axis of the second waveguide element is not aligned with the line of sight the observer, thereby allowing the second waveguide element to be tilted about two orthogonal axes to fit within the cockpit, but the image bearing light will exit the second waveguide element along an axis aligned with the line of sight the observer.

The first grating may be a transmission or reflection type grating.

The exit grating may be arranged to diffract image bearing light out of the second waveguide such that the image bearing light will form an elevation angle with a normal axis of the second waveguide element. The spatial frequency of the exit grating may be arranged to diffract image bearing light out of the second waveguide such that the image bearing light will form an elevation angle with a normal axis of the second waveguide element.

The exit grating may be arranged to diffract image bearing light out of the second waveguide such that the image bearing light will form an azimuth angle with a normal axis of the second waveguide element. The exit grating may be arranged to perform a rotation of image bearing light such that the image bearing light will form an azimuth angle with the normal axis of the second waveguide element.

The exit grating may be arranged to diffract image bearing light out of the second waveguide such that the image bearing light will form an elevation and an azimuth angle to a normal axis with the second waveguide element. The spatial frequency of the exit grating may be arranged to diffract image bearing light out of the second waveguide such that the image bearing light will form an elevation angle to the normal axis of the second waveguide element and the exit grating may be arranged to perform a rotation of the image bearing light such that the image bearing light will form an azimuth angle with a normal axis of the second waveguide element.

The first grating may be arranged such that incident inputted image bearing light is diffracted therefrom with the incidence angle of the diffracted light at internal surfaces of the first waveguide element arranged to be greater that the critical angle for the material from which the first waveguide element is made.

The first grating may be a low efficiency grating.

The coupling grating may be arranged such that incident image bearing light is diffracted therefrom with the incident angle of the diffracted light at internal surfaces of the second waveguide element arranged to be greater than the critical angle for the material from which the second waveguide element is made.

The diffractive power of the coupling grating may be rotated through 90° with respect to the diffractive power of the first grating.

The second waveguide element may include a narrow band selective reflection coating provided on a surface of the second waveguide element parallely spaced from the exit grating, which reflective coating is arranged to reflect light diffracted from the exit grating back to the exit grating.

The first waveguide element and/or the second waveguide element may be curved.

The first waveguide element may include an input region arranged to receive injected image bearing light via reflective, or transmissive, or refractive means.

The first waveguide element may be plate-like, the second waveguide element may be plate-like and the first and second waveguide elements may be arranged substantially co-planar to one another.

The first waveguide element and the second waveguide element may be arranged substantially in the same plane. The first waveguide element and the second waveguide element may be formed within a single piece of material.

The project display may form part of a Head Up Display, or Helmet Mounted. Display, or Head Mounted. Display.

The invention will now be described, by way of example only, with reference to, the accompanying drawings, in which.

Figure 3:
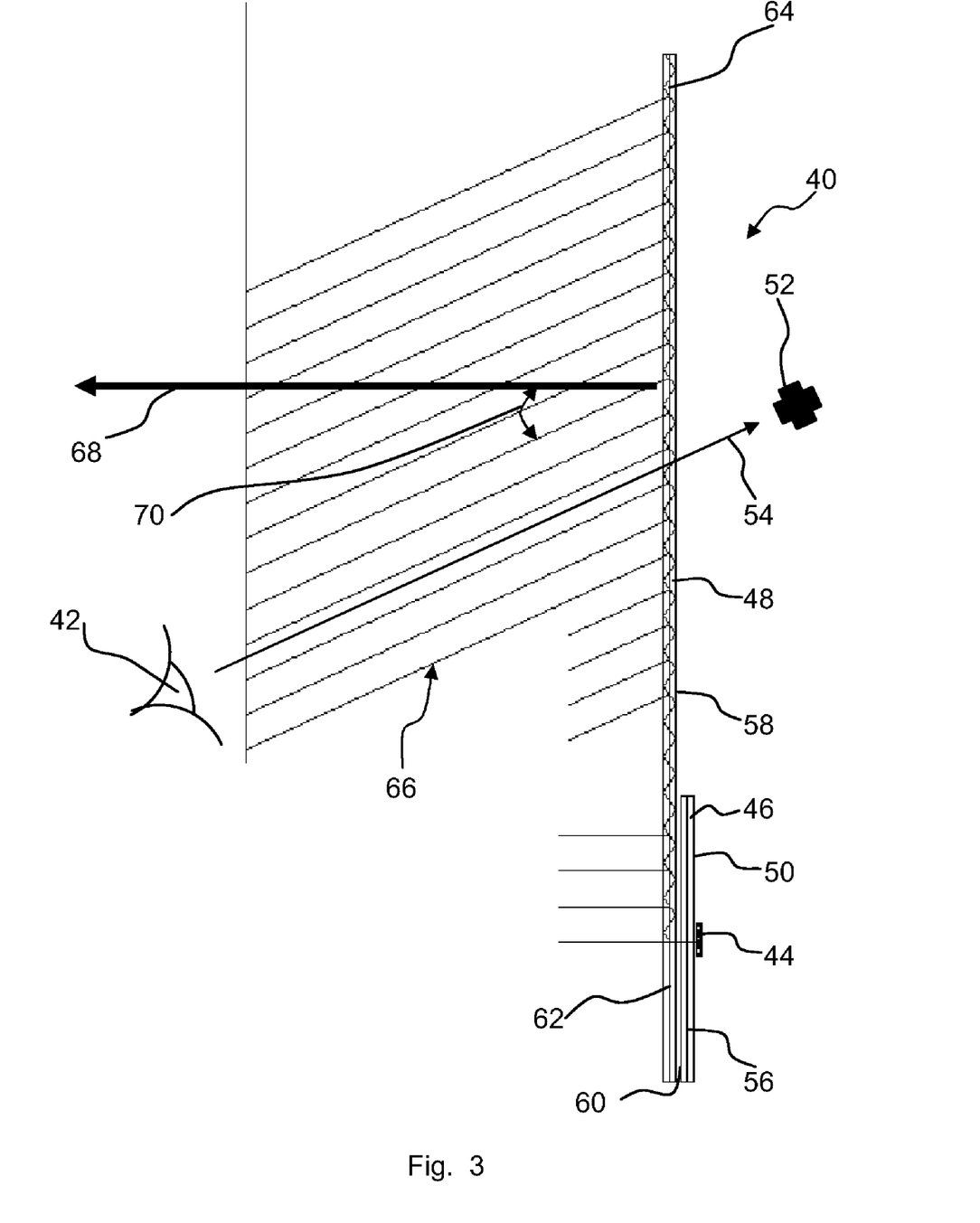
FIG. 3 illustrates, in elevation, a projection display according to the present invention.

Referring to FIG. 3, that illustrates in elevation view, a projection display 40 according to the present invention, for displaying an image to an observer 42 that uses waveguide techniques to generate a collimated display defining a large exit pupil at the point of the observer 42 and a large field of view, whilst using a small image-providing light source device 44. The projection display 40 uses a first waveguide element 46, for example formed in a plate-like shape, made of light transmissive material such as glass or plastic and a second waveguide element 48, for example formed in a plate-like shape, made from a light transmissive and light transparent material such as glass or plastic. The image-providing light source device 44 is located to inject collimated image bearing light into the first waveguide element 46 through a first face 50.

The image-providing light source device 44 includes a micro-display arranged to provide information to be displayed to the observer 42. Additionally the image-providing light source device 44 includes a collimating optical arrangement located between the micro-display and the first face 50 of the first waveguide element 46. The collimating optical arrangement is operable to collimate light received from the micro-display and to inject the collimated image bearing light into the first waveguide element 46 through the first face 50.

The collimated image bearing light produced by the collimating optical arrangement has a small exit pupil and is fed into the first waveguide element 46, which performs the function of stretching the horizontal pupil of the final display to be displayed to the observer 42. The output from the first waveguide 46 is fed into the second waveguide element 48, which is arranged to stretch the vertical pupil of the final display and also to act as a combiner for the projection display 40 through which the observer 42 views an outside world scene 52 along a line of sight 54 with information to be displayed to the observer 42 overlaid on the outside world scene 52. In this manner, the information to be displayed to the observer 42 looking through the second waveguide element 48 defines a large exit pupil and a large field of view whilst using a small image generating light source 44.

Image bearing light injected into first waveguide element 46, via first face 50 is incident on a first granting, in this example, a transmission grating 56 arranged internally within the first waveguide element 46 and substantially co-planar with the first face 50. Light impinging on the transmission grating 56 diffracts therefrom such that the incidence angle of the image bearing light on the internal surfaces of the first waveguide element 46 is greater than the critical angle for the material from which the first waveguide element 46 is made. The image bearing light is constrained within the first waveguide element 46 to propagate along the first waveguide element 46 reflecting from each internal surface in turn to follow a predefined light path. Thus, the relative field angles of the light incident on the first waveguide element 46 at the first face 50 are preserved within the first waveguide element 46 and the information required to regenerate the original image to be displayed is preserved.

The transmission grating 56 also serves to output the image bearing light from the first waveguide element 46. The transmission grating 56 is a low efficiency grating which diffracts a small amount of light out of the first waveguide element 46 on each interaction with incident image bearing light.

The second waveguide element 48 is located with a first face 58 co-planar with a second face 60 of the first waveguide element 46 and is arranged to receive the image bearing light exiting the second face 60 of the first waveguide element 46. The second face 60 is co-planar to the first face 50 of the first waveguide element 46. The first face 58 of the second waveguide element 48 is located adjacent and close to the second face 60 of the first waveguide element 46. The second waveguide element 48 includes a coupling grating 62 located therein arranged substantially co-planar to the first face 58 of the second waveguide 48 and the coupling grating 62 is operable to diffract each impinging ray of image bearing light received from the transmission grating 62 of the first waveguide element 46 at an angle that is larger than the critical angle for the material from which the second waveguide element 48 is made. Accordingly, received image bearing light will propagate inside the second waveguide element 48 to follow a predefined light path. The image bearing light continues along the light path to an exit grating 64 arranged on or within the second waveguide element 48, which is arranged to diffract the received image bearing light out of the second waveguide element 48 towards the observer 42.

The coupling grating 62 is arranged such that its diffractive power is rotated through 90 degrees to that of the diffractive power of the co-planar transmission grating 56 to rotate incident image bearing light towards the exit grating 64.

The exit grating 64 is a low efficiency grating, such that as image bearing light propagates along the light path within the second waveguide 48, each interaction with the exit grating 64 causes a small proportion of image bearing light to be diffracted out of the second waveguide element 48. Image bearing light which is not diffracted out of the second waveguide element 48 continues to propagate within the second waveguide 48. Accordingly, a large number of parallel rays 66 of image bearing light exit the second waveguide element 48 through the exit grating 64 towards the observer 42, which originated at discrete points on the micro-display forming the image generating light source device 44. Accordingly, the observer 42 will view a real world scene 52 with the image to be displayed to the observer 42 overlaid on the real world scene 52.

It will be noted that the parallel rays 66 of image bearing light are of axis with respect to a normal axis 68 of the second waveguide element 48. The exit grating is arranged to ensure that the parallel rays 66 exiting the second waveguide element 48 are diffract off the normal axis 68 to form an elevation angle 70 with the normal axis 68 to provide parallel rays 66 substantially aligned with the line of sight 54 of the observer 42. This is achieved by arranging the spatially frequency, i.e. the pitch of diffraction, of the exit grating 64 to rotate the parallel rays 66 about the normal axis 68 by the elevation angle 70.

Figure 4:
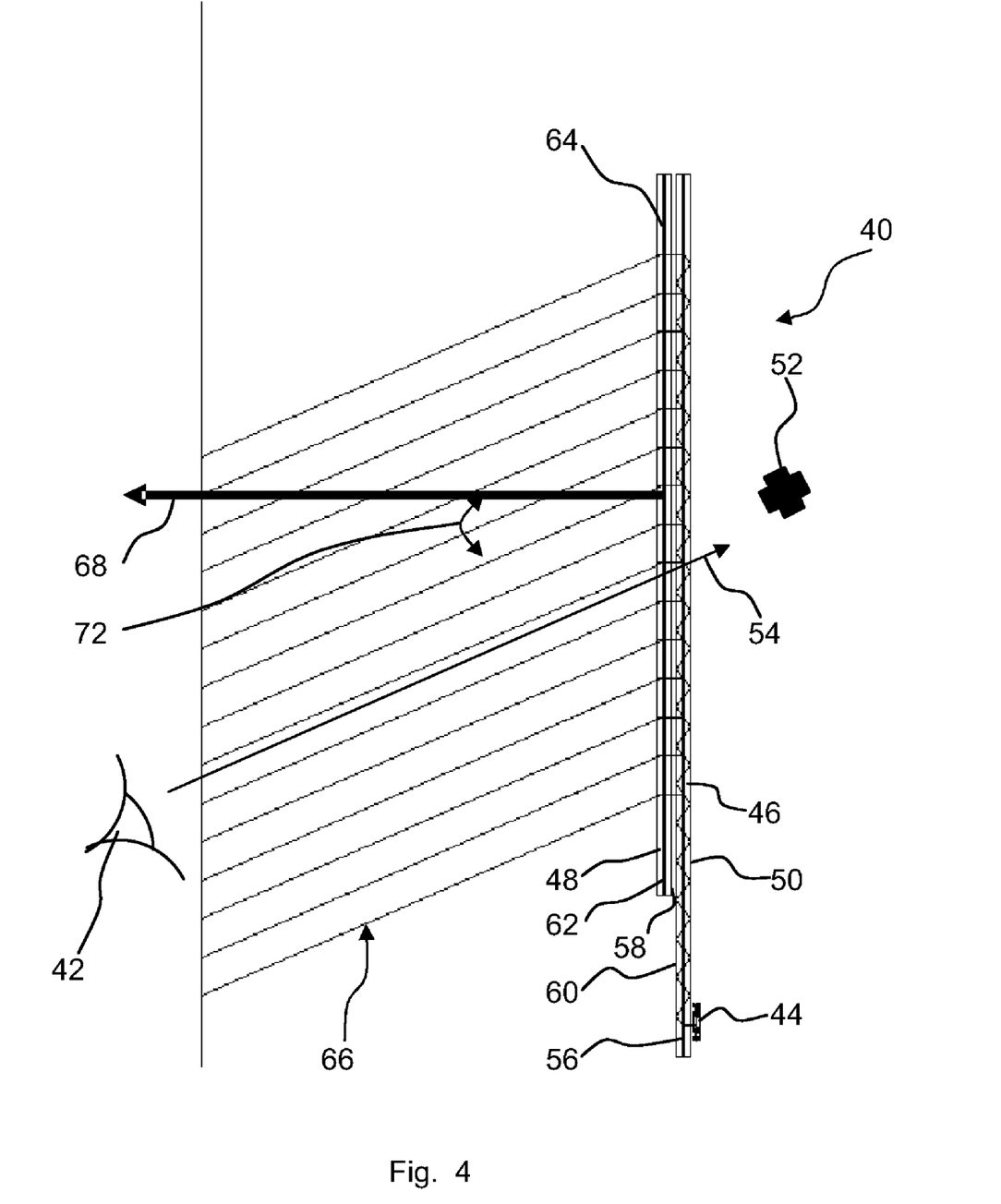
FIG. 4 illustrates, in plan view, the projection display of FIG. 3.

Referring to FIG. 4, where in like references have been used to indicate similar integers to those described with reference to FIG. 3, there is illustrated the projection display 40 of the present invention in plan view. It will be noted that the parallel rays 66 of image bearing light are off axis with respect to a normal axis 68 of the second waveguide element 48. The exit grating is arranged to ensure that the parallel rays 66 exiting the second waveguide element 48 are diffract off the normal axis 68 to form an azimuth angle 72 with the normal axis 68 provide parallel rays 66 substantially aligned with the line of sight 54 of the observer 42. This is achieved by arranging the exit grating 64 to perform a gamma rotation of the fringes of the parallel rays 66 about the normal axis 68 by the azimuth angle 72.

Accordingly, the image to be displayed can be provided offset to a normal axis 68 of the second waveguide element 48, thereby allowing the orientation of the projection display 40, relative to a housing to which is attached, to be altered thus providing greater scope to install such a projection display 40 within the housing. For example, the projection display could be mounted within a cockpit of an aircraft, wherein the size constraints of the cockpit would result in difficulty in installing a prior art projection display 10, as the prior art projection display 10 would need to be mounted such that axis 32 normal to the second plate-like waveguide 18 is aligned to a line of sight 24 of an observer 12 using the projection display 10. However, in the present invention, the projection display 40 can be mounted such the normal axis 68 of the second waveguide element 48 is not aligned with the line of sight 54 the observer 42, thereby allowing the second waveguide element 48 to be tilted about two orthogonal axes to fit within the cockpit, but the parallel rays 66 of image bearing light will exit the second waveguide element 48 along an axis aligned with the line of sight 54 the observer 42.

Figure 5:
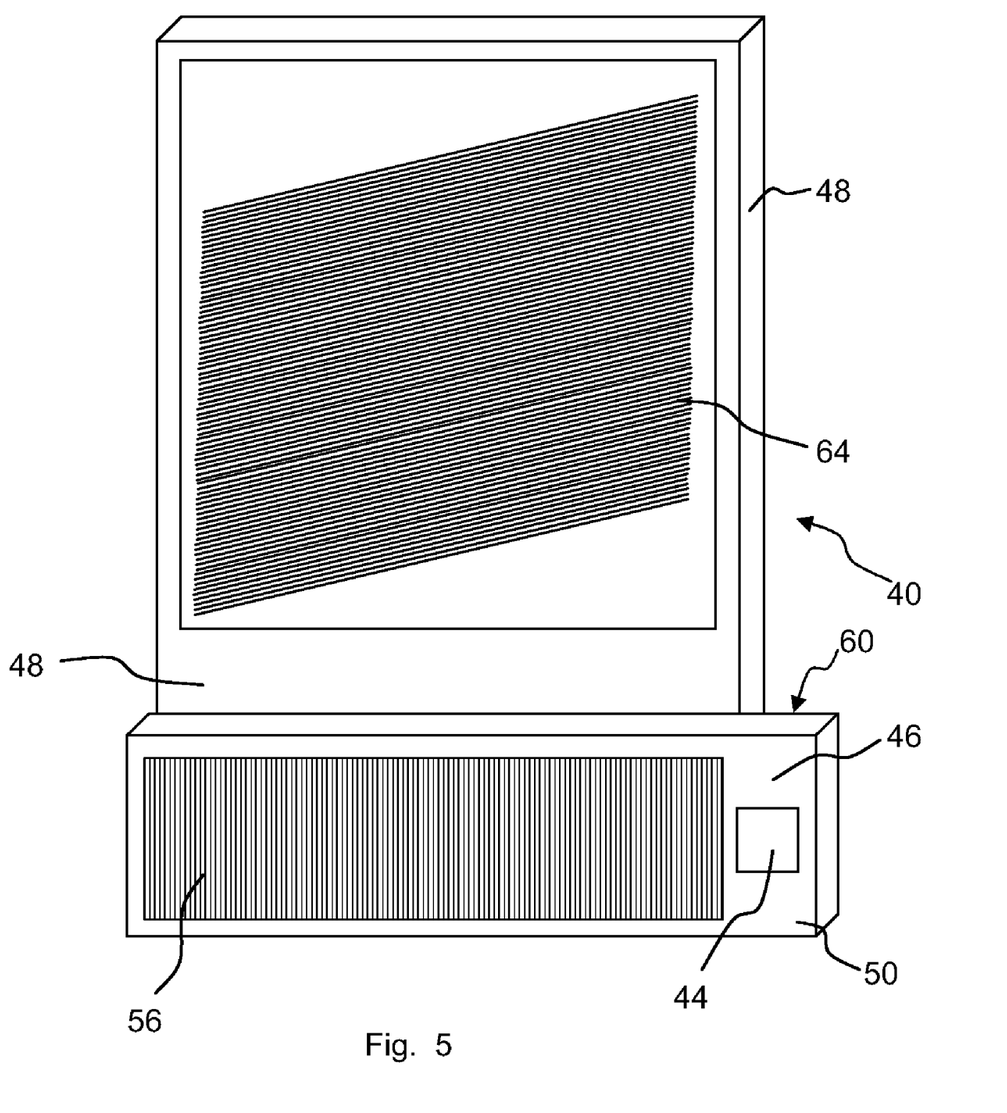
FIG. 5 illustrates, in perspective view, a projection display according to the invention.

Referring to FIG. 5, where in like references have been used to indicate similar integers to those described with reference to FIG. 3, it will be observed that the exit grating 64 is rotationally offset with respect to the second waveguide element 48 to provide azimuth rotation of image bearing light.

Figure 6:
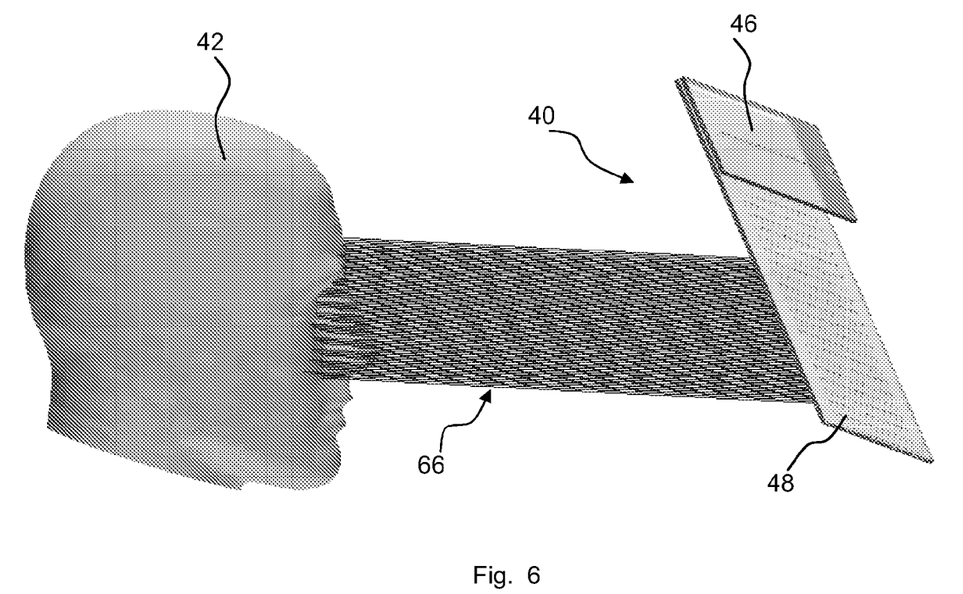
FIG. 6 illustrates, in elevation, a projection display with rays of image bearing light directed off an axis normal to a second waveguide element.

Referring to FIG. 6, where in like references have been used to indicate similar integers to those described with reference to FIG. 3, in operation, the parallel rays 66 of image bearing light are offset with respect to a normal axis of the second waveguide element 48, thereby allowing the display projector to be rotated in elevation. This allows the display projector 40 to be tilted in elevation when installed and the observer 42 to still view the image bearing light overlaid on a outside world scene.

Figure 7:
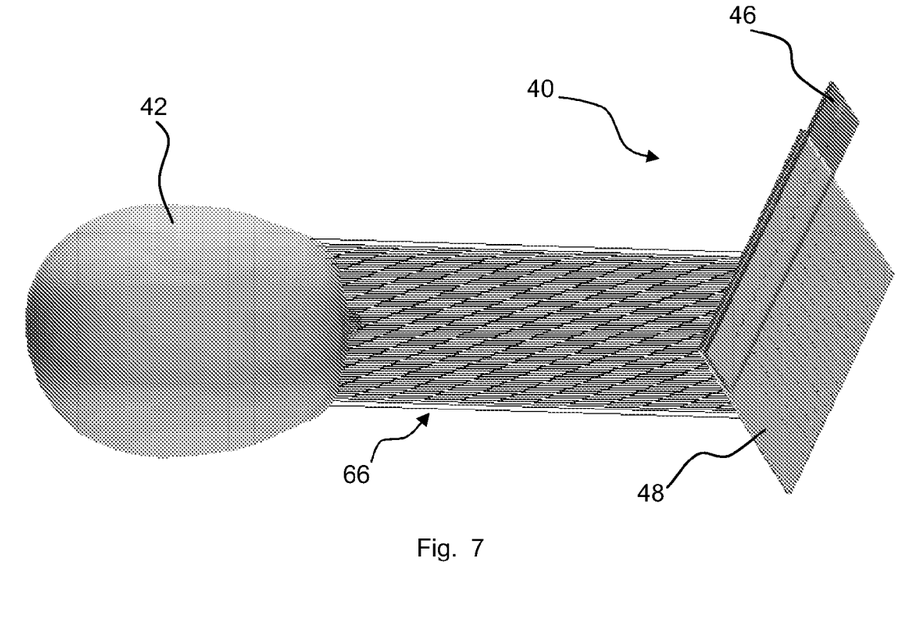
FIG. 7 illustrates, in plan view, a projection display according to the invention with rays of image bearing light offset with respect to a normal axis or the second waveguide element.

Referring to FIG. 7, where in like references have been used to indicate similar integers to those described with reference to FIG. 3, in operation, the parallel rays 66 of image bearing light are offset with respect to a normal axis of the second waveguide element 48, thereby allowing the display projector to be rotated in azimuth. This allows the display projector 40 to be tilted in azimuth when installed and the observer 42 to still view the image bearing light overlaid on a outside world scene.

In will be understood that it is possible to offset the second waveguide element 48 in elevation or azimuth only about a normal axis of the second waveguide element 48 or to combine elevation and azimuth offset about a normal axis to the second waveguide element 48 to allow the display projection 40 to be tilted in two orthogonal axis, elevation and azimuth, when installed and the observer 42 to still view the image bearing light overlaid on an outside world scene.

Referring to FIG. 3, the exit grating 64 not only diffracts light towards the observer 42 but also diffracts light away from the observer 42. Preferably, a narrow band selective reflection coating, not shown, is provided on at least part of the first face 58 of the second plate-like waveguide 48 to reflect light diffracted from the exit grating 64 back to the exit grating 64 to increase display efficiency.

Preferably, the coupling grating 62 and/or the formation of the exit grating 64 are such so as to co-operate to generate a multiplicity of overlapping display images. To this end the exit grating 64 can be duplicated within the body of the second plate-like waveguide 48 and additionally at a second face thereof, parallel spaced from the first face 58.

It will be noted that the collimating lens arrangement of the image-providing light source device 44 is the only integer of the optical train that includes optical power and are arranged to create the image to be displayed, albeit with a small exit pupil. The collimating lens arrangement creates collimated image bearing light such that the angle of a ray of the image bearing light exiting the collimating lens arrangement corresponds to a unique position within the total field of view of the image to be displayed. This condition is maintained throughout the pathway of the image bearing light through the first and second waveguides elements 46 and 48 to maintain the image to be displayed.

The first waveguide element 46 and the second waveguide element 48 of the present invention have two purposes: the first is to expand the small exit pupil provided by the collimating lens arrangement in two orthogonal axes; and the second is to act as a combiner structure to present the image be displayed to the observer 42 overlaid on an outside world scene 52. As each angle inputted into the first waveguide element 46 is maintained as being unique to a particular field position of the image to be displayed, in a continuous manner, then the image to be displayed will be maintained. This unique field position is also maintained through the second waveguide element 48 to produce the image to be displayed.

Although the first waveguide element 46 and the second waveguide element 48 have been shown as planar in the illustrated embodiment of the present invention either the first waveguide element 46 and/or the second waveguide element 48, if desired, can be made curved.

It will be understood that an alternative embodiment of the invention could include first and second waveguide elements formed in a single piece of material, such material providing the correct optical properties for each waveguide element In this case, the first and second waveguide elements can be arranged within the material either co-planar or planar with respect to one another. Such an embodiment would provide easier alignment of the first and second waveguide elements.

The transmission grating 18, coupling grating 24 and exit grating 26 can be formed by suitable holograms and/or semi-reflective surfaces.

Additionally, the projection display illustrated according to the invention can form part of a Head Up Display, of a Helmet Mounted Display and/or of a Head. Mounted Display, particularly for aircraft usage.

The invention claimed is:

1. A projection display, for displaying an image to an observer overlaid on an outside world scene viewed through the display, including:
   a first waveguide element arranged to be light transmissive;
   an image-providing light source device arranged to generate an image and to inject image bearing light into the first waveguide element;
   a first grating associated with the first waveguide element arranged to direct the image bearing light internally along the first waveguide element and through which the image bearing light is outputted from the first waveguide element;
   a second waveguide element arranged to be light transmissive and transparent that includes a coupling grating arranged to receive the image bearing light from the first waveguide element and to direct the image bearing light along the second waveguide element;
   the second waveguide element further includes an exit grating arranged to diffract received image bearing light out of the second waveguide element towards an observer, the second waveguide being a combiner through which the observer can view an outside world scene along a line of sight with the image overlaid on the outside world scene; and
   wherein the exit grating is arranged to diffract image bearing light out of the second waveguide element off axis to a normal axis of the second waveguide element and along said line of sight.

2. A projection display, as claimed in claim 1, wherein the exit grating is arranged to diffract image bearing light out of the second waveguide such that the image bearing light will form an elevation angle with a normal axis of the second waveguide element.

3. A projection display, as claimed in claim 2, wherein the spatial frequency of the exit grating is arranged to diffract image bearing light out of the second waveguide such that the image bearing light will form an elevation angle with a normal axis of the second waveguide element.

4. A projection display, as claimed in claim 1, wherein the exit grating is arranged to diffract image bearing light out of the second waveguide such that the image bearing light will form an azimuth angle with a normal axis of the second waveguide element.

5. A projection display, as claimed in claim 4, wherein the exit grating is arranged to perform a rotation of image bearing light such that the image bearing light will form an azimuth angle with the normal axis of the second waveguide element.

6. A projection display, as claimed in claim 1, wherein the exit grating is arranged to diffract image bearing light out of the second waveguide such that the image bearing light will form an elevation and an azimuth angle to a normal axis with the second waveguide element.

7. A projection display, as claimed in claim 6, wherein the spatial frequency of the exit grating is arranged to diffract image bearing light out of the second waveguide such that the image bearing light will form an elevation angle to the normal axis of the second waveguide element and the exit grating is arranged to perform a rotation of the image bearing light such that the image bearing light will form an azimuth angle with a normal axis of the second waveguide element.

8. A projection display, as claimed in claim 1, wherein the first grating is arranged such that incident inputted image bearing light is diffracted therefrom with the incidence angle of the diffracted light at internal surfaces of the first waveguide element arranged to be greater that the critical angle for the material from which the first waveguide, element is made.

9. A projection display, as claimed in claim 1, wherein the transmission grating is a low efficiency grating.

10. A projection display, as claimed in claim 1, wherein the coupling grating is arranged such that incident image bearing light is diffracted therefrom with the incident angle of the diffracted light at internal surfaces of the second waveguide element arranged to be greater than the critical angle for the material from which the second waveguide element is made.

11. A projection display, according to claim 1, wherein the diffractive power of the coupling grating is rotated through 90° with respect to the diffractive power of the first grating.

12. A projection display, according to claim 1, wherein the second waveguide element includes a narrow band selective reflection coating provided on a surface of the second waveguide element spaced parallel to the exit grating, which reflective coating is arranged to reflect light diffracted from the exit grating back to the exit grating.

13. A projection display, according to claim 1, wherein the first plate-like waveguide is curved.

14. A projection display, according to claim 1, wherein the second plate-like waveguide is curved.

15. A projection display, according to claim 1, wherein the first waveguide element includes an input region arranged to receive injected image bearing light via reflective, or transmissive, or refractive means.

16. A projection display, as claimed in claim 1, wherein the first waveguide element is plate-like, the second waveguide element is plate-like and the first and second waveguide elements are arranged substantially co-planar to one another.

17. A projection display, as claimed in claim 1, wherein the first waveguide element and the second waveguide element are arranged substantially in the same plane.

18. A projection display, as claimed in claim 17, wherein the first waveguide element and the second waveguide element are formed within a single piece of material.

19. A Head Up Display, or Helmet Mounted Display, or Head Mounted Display including a projection display according to claim 1.

* * * * *